(12) United States Patent
Wakuda et al.

(10) Patent No.: US 8,727,631 B2
(45) Date of Patent: May 20, 2014

(54) RETAINER, DEEP GROOVE BALL BEARING, AND BEARING WITH SEAL

(75) Inventors: Takahiro Wakuda, Kuwana (JP); Katsuaki Sasaki, Iwata (JP); Shohei Fukama, Iwata (JP)

(73) Assignee: NTN Corporation, Osaka (JP)

(*) Notice: Subject to any disclaimer, the term of this patent is extended or adjusted under 35 U.S.C. 154(b) by 435 days.

(21) Appl. No.: 12/993,520

(22) PCT Filed: May 26, 2009

(86) PCT No.: PCT/JP2009/059558
§ 371 (c)(1),
(2), (4) Date: Nov. 19, 2010

(87) PCT Pub. No.: WO2009/150935
PCT Pub. Date: Dec. 17, 2009

(65) Prior Publication Data
US 2011/0069918 A1    Mar. 24, 2011

(30) Foreign Application Priority Data

Jun. 13, 2008  (JP) ................................ 2008-155909
Jul. 9, 2008   (JP) ................................ 2008-178620

(51) Int. Cl.
*F16C 33/38*   (2006.01)
*F16C 33/76*   (2006.01)

(52) U.S. Cl.
USPC .......................................... 384/523; 384/482

(58) Field of Classification Search
USPC ........... 384/482, 484, 523, 530; 277/556, 935
See application file for complete search history.

(56) References Cited

U.S. PATENT DOCUMENTS

| 1,712,222 A | * | 5/1929 | Linde ............................. 384/529 |
| 4,505,484 A | * | 3/1985 | Ohkuma et al. ............... 277/348 |
| 4,854,749 A | | 8/1989 | Kohigashi et al. |
| 4,958,946 A | * | 9/1990 | Voll ............................... 384/523 |
| 5,037,213 A | * | 8/1991 | Uchida et al. ................. 384/482 |

(Continued)

FOREIGN PATENT DOCUMENTS

| EP | 1 083 350 | 3/2001 |
| JP | 46-3130   | 2/1971 |

(Continued)

OTHER PUBLICATIONS

Translation of JP2006342901 obtained Nov. 12, 2013.*

(Continued)

*Primary Examiner* — James Pilkington
(74) *Attorney, Agent, or Firm* — Wenderoth, Lind & Ponack, L.L.P.

(57) ABSTRACT

A retainer provides torque reduction. The retainer is formed by two annular retaining plates each including semispherical swelling portions arranged at predetermined intervals along a circumferential direction. The semispherical swelling portions face each other and form pockets for retaining balls. Each of the pockets has ball-facing surfaces each including a ball non-contact portion, and a contact area in each of the pockets with respect to each of the balls is reduced by from 15% to 30% by the ball non-contact portion. Each of the seal members serves as a contact seal having a seal lip portion coming into contact with another of raceway, and a material of at least a distal end of the seal lip portion includes a high-abrasion material which is prone to abrasion.

16 Claims, 11 Drawing Sheets

(56) References Cited

U.S. PATENT DOCUMENTS

| | | | |
|---|---|---|---|
| 5,806,990 A * | 9/1998 | Ueno et al. ............... | 384/530 |
| 6,790,297 B1 | 9/2004 | Ueda et al. | |
| 2008/0187263 A1* | 8/2008 | Spielfeld et al. ........... | 384/523 |
| 2012/0051680 A1* | 3/2012 | Ishikawa et al. ........... | 384/462 |

FOREIGN PATENT DOCUMENTS

| JP | 46-34244 | 11/1971 |
|---|---|---|
| JP | 62-92324 | 6/1987 |
| JP | 2001-146922 | 5/2001 |
| JP | 2003-13962 | 1/2003 |
| JP | 2003-287040 | 10/2003 |
| JP | 2006-226447 | 8/2006 |
| JP | 2006-342901 | 12/2006 |
| JP | 2007-107588 | 4/2007 |

OTHER PUBLICATIONS

International Search Report issued Jun. 30, 2009 in International (PCT) Application No. PCT/JP2009/059558.

International Preliminary Report on Patentability and Written Opinion of the International Searching Authority issued Jan. 20, 2011 in International (PCT) Application No. PCT/JP2009/059558.

* cited by examiner

SHAPE A

SHAPE B

SHAPE C

SHAPE D

SHAPE E

SHAPE F

RETAINER, DEEP GROOVE BALL BEARING, AND BEARING WITH SEAL

BACKGROUND OF THE INVENTION

1. Technical Field

The present invention relates to a retainer, a deep-groove ball bearing, and a sealed bearing.

2. Background Art

As illustrated in FIG. 15, the bearing (deep-groove ball bearing) includes an outer race 2 having a circular-arc outer raceway surface 1 formed on an inner periphery thereof, an inner race 4 having a circular-arc inner raceway surface 3 formed on an outer periphery thereof to face the outer raceway surface 1, a retainer 5 arranged between the inner race 4 and the outer race 2, and a plurality of balls Bo rollably supported by the retainer 5.

As illustrated in FIG. 16, the retainer 5 is formed by combination of two annular retaining plates 7 and 7 each including semispherical swelling portions 6 arranged at predetermined intervals along a circumferential direction. Specifically, each of the annular retaining plates 7 includes the semispherical swelling portions 6 arranged along the circumferential direction and flat portions 8 between the semispherical swelling portions 6 adjacent to each other. In a combined state, the flat portions 8 and 8 are superimposed on each other, and the flat portions 8 and 8 are coupled to each other through intermediation of fasteners 9 such as rivets. Thus, the semispherical swelling portions 6 face each other to form ring-shaped ball-fitting portions (pockets) 10.

Conventionally, there has been provided a bearing in which a lubrication state of the retainer and the balls (Patent Literature 1) is improved, a bearing in which a lubricating oil is positively fed and discharged so that fluidity of the lubricating oil in the bearing is enhanced (Patent Literature 2), or the like.

The bearing described in Patent Literature 1 includes support recessed portions provided on inner peripheral sides of each of the pockets, the support recessed portions being made to function as lubricant pools for storing lubricant. With this, a retaining amount of the lubricant in the pockets is increased so that the lubrication state of the retainer and the balls is improved.

Further, the bearing described in Patent Literature 2 similarly includes recessed portions formed on inner peripheral surfaces of each of the pockets. The recessed portions respectively communicate to a bearing space side between the outer race and the retainer and to a bearing space side between the inner race and the retainer so that lubricating oil paths having recessed-groove shape are formed.

By the way, foreign matter such as abrasion powder of gears is mixed in an automobile transmission. Thus, a conventional bearing used for an automobile transmission is a sealed bearing including contact-type seal members for sealing a bearing space formed between the inner and outer races thereof. With this structure, foreign matter is prevented from intruding into the bearing.

When the bearing space is sealed with the contact-type seal members, foreign matter is prevented from intruding into the bearing. However, large seal torque of the seal members constitutes a problem with improvement of fuel efficiency of automobiles. As the sealed bearing, there has been proposed one of a type that the seal torque is reduced (for example, Patent Literature 3). In the sealed bearing described in Patent Literature 3, shot peening is performed on a surface with which a seal lip portion comes into sliding contact, for example, on an inner wall surface of a seal groove of a bearing rotating race. In this manner, a maximum roughness Ry of the contact surface is set to be small, specifically, 2.5 μm or less. With this, the seal torque is reduced.

CITATION LIST

Patent Literature

Patent Literature 1: JP 2003-13962 A
Patent Literature 2: JP 2006-342901 A
Patent Literature 3: JP 2007-107588 A

SUMMARY OF THE INVENTION

Technical Problems

In recent years, reduction of torque of automobile bearings has been required in terms of higher energy efficiency and environmental problems. Of torques generated in the bearing, a large percentage of a torque caused by the retainer is occupied by resistance generated when steel balls (balls) shear an oil (lubricant such as grease).

Almost all the shearing resistance is generated at the time of shearing an oil film formed between a radially inner surface of the pocket and the ball in the pocket. Further, when the pocket is constituted by a single curved surface in conformity with the ball, torque is generated because lubricant is to pass through a minute gap between the ball and an inside of the retainer pocket covering the ball, which constitutes a factor of a torque increase.

In the bearing described in Patent Literature 1 described above, the support recessed portions function as the lubricant pools, and lubricant is stored in the support recessed portions. Further, in the bearing described in Patent Literature 2, the resistance generated when lubricant passes through the minute gap is not reduced. Specifically, in the bearings of those types, reduction of the resistance generated when lubricant passes and reduction of an amount of the oil film sheared when the balls move have not been able to be achieved simultaneously. Thus, conventionally, torque reduction cannot be achieved even when the recessed portion is formed in the radially inner surface of the pocket.

Further, even when the seal torque is reduced by reduction of the surface roughness of the contact surface as in the sealed bearing described in Patent Literature 3 or the like, a torque reduction effect is limited. Meanwhile, although the seal torque is eliminated with use of a non-contact seal, downsizing of the seal gap to an extent of preventing intrusion of foreign matter such as the above-mentioned gear abrasion powder is difficult to achieve owing to assembly errors, processing errors, a difference of thermal expansion, and the like.

In view of the above-mentioned problems, the present invention has been made to provide a retainer capable of achieving torque reduction, a deep-groove ball bearing with the retainer, and a sealed bearing capable of preventing intrusion of foreign matter into the bearing and capable of sufficient seal torque reduction.

Solution to Problems

The present invention provides a retainer which is formed by combination of two annular retaining plates each including semispherical swelling portions arranged at predetermined intervals along a circumferential direction, semispherical swelling portions facing each other and forming pockets for retaining balls, in which: each of the pockets has ball-facing surfaces each including a ball non-contact portion; and a contact area in each of the pockets with respect to each of the balls is reduced by from 15% to 30% in comparison with a contact area with respect to each of the balls without provision of the ball non-contact portion. Note that, strength of the retainer is reduced when the area is reduced by more than 30%, and hence an upper limit is set to 30%. Meanwhile, torque cannot be sufficiently reduced (approximately by 50%) when the area is reduced by less than 15%.

According to the retainer of the present invention, by provision of the ball non-contact portion on the ball-facing surface, resistance generated when lubricant passes inside the pockets can be reduced. Further, by the provision of the ball non-contact portion, an amount of an oil film formed between the balls and the pockets can be reduced. In this case, when the ball non-contact portion is excessively small, a reduction amount of an oil film to be sheared is reduced, and hence torque reduction cannot be achieved. In contrast, when the ball non-contact portion is excessively large, the amount of the oil film formed between the balls and the pockets is excessively small, and hence the balls are unable to smoothly roll. Thus, by setting of a range of the ball non-contact portion as in the present invention, resistance generated when lubricant passes inside the pockets and the amount of the oil film to be sheared can be simultaneously reduced.

In accordance with formation of a protruding portion on an opposite ball-facing surface, each of the semispherical swelling portions includes a recessed portion provided on the ball-facing surface, the protruding portion projecting to an opposite ball side, the recessed portion being recessed to the opposite ball side. Thus, the ball non-contact portion may be constituted by the recessed portion. Alternatively, each of the semispherical swelling portions may include a slit, and the ball non-contact portion may be constituted by the slit.

It is preferred that the ball non-contact portion be arranged on a bearing radially-outer side with respect to a pitch circle of the balls.

The retainer may be made of a metal and molded by press working, made of a metal and molded by casting, or made of a resin and formed by injection molding. Further, the retainer may be molded by cutting (using any of a metal and a resin).

A deep-groove ball bearing according to the present invention includes: an outer race having an outer raceway surface formed on an inner periphery thereof; an inner race having an inner raceway surface formed on an outer periphery thereof; a plurality of balls rolling between the inner raceway surface and the outer raceway surface; and the retainer arranged between the inner race and the outer race.

A sealed bearing according to the present invention includes: a plurality of rolling elements retained through intermediation of a retainer to be interposed between raceway surfaces facing each other of a pair of bearing races; and seal members for sealing a bearing space formed between the pair of bearing races, in which: each of the seal members includes a contact seal having a proximal end fixed to any one of the bearing races and a seal lip portion coming into contact with another of the bearing races; a material of at least a distal end of the seal lip portion includes a high-abrasion material which is abraded, with use of the bearing under a rotational state, so as to become a non-contact seal or which makes contact slight to an extent that contact pressure is practically ignored; and the retainer of the sealed bearing includes the retainer according to the present invention. Note that, the "high-abrasion material" herein represents an abrasion-prone material.

In this structure, at least the distal end of the seal lip portion of the seal member is made of the high-abrasion material as just described above. Thus, the seal member which has been of a contact type at an early stage of driving changes into the seal member of a non-contact type due to abrasion soon after the start of the driving, for example. Alternatively, contact which is slight to an extent that contact pressure can be ignored is made due to the abrasion.

In the present invention, an entire or the distal end of the seal lip portion of each of the seal members may constitute a high-abrasion-material portion made of a material prone to abrasion in comparison with other parts of each of the seal members. Materials providing proper high-abrasion property are limited, and hence it is not preferred to impart high-abrasion property to the entire of the seal members in some cases. However, when only the entire of or the distal end of the seal lip portion is made of a different material to have high-abrasion property, preferred high-abrasion property can be obtained.

The high-abrasion material may include a rubber material, that is, a high-abrasion rubber material, and a resin material. Other examples of the high-abrasion materials include a solid lubricant material, non-woven fabric, and mild steel. In the present invention, each of the seal members may have a shape of an axial contact type or a shape of a radial contact type. For example, the seal lip portion may be formed in a shape of coming into contact in an axial direction with an inner surface of corresponding one of seal grooves formed in one of the bearing races facing each other. Alternatively, the seal lip portion may be formed in a shape of coming into contact in a radial direction with one of the bearing races facing each other.

In the present invention, each of the seal members may include adhesion prevention means for preventing each of the seal members from adhering to the another of the bearing race. The adhesion prevention means includes a vent slit provided at the distal end of each of the seal members.

When the contact-type seal members are provided, the seal members may be caused to adhere to the bearing race owing to reduction of inner pressure of the bearing, which leads to a torque increase in some cases. Although the high-abrasion material is used in the present invention, an adhesion effect occurs similarly to general contact seals until the seal members are completely abraded.

Advantageous Effects of Invention

In the retainer according to the present invention, by setting of a range of the ball non-contact portion, resistance generated when lubricant passes inside the pockets and the amount of the oil film to be sheared can be simultaneously reduced.

The ball non-contact portion can be reliably formed by provision of the recessed portion or the slit in the ball-facing surface, the recessed portion being recessed to the opposite ball side. When the ball non-contact portion is arranged on a radially outer side of the bearing with respect to the pitch circle of the balls, shearing resistance at a high-circumferential velocity position can be reduced, and hence torque reduction can be more stably achieved.

The entire shape of the retainer is relatively simple, and hence the retainer can be reliably formed irrespective of a metal or a resin. Further, regarding molding methods, the retainer can be molded by press working or casting with use of a metal, and can be formed by injection molding with use of a resin. In this way, the retainer can be molded by conventional various molding methods which have been generally used, and hence cost reduction can be achieved.

As a result, torque reduction can be achieved, which enables environmentally friendly driving due to higher energy efficiency achieved with use of a bearing with the retainer for automobiles.

In the sealed bearing according to the present invention, the seal member which has been of the contact type at the early stage of driving changes into the seal member of the non-contact type due to abrasion soon after the start of the driving, for example. Alternatively, contact which is slight to an extent that contact pressure can be ignored is made due to the abrasion. Thus, the seal torque can be sufficiently reduced. Further, the abrasion causes formation of the minute gap constituting an optimum non-contact seal gap between the seal lip portion and the rotating race, or causes the slight contact as described above. Thus, intrusion of foreign matter having a large grain size which may have an influence on a bearing life is prevented while a lubricating oil is allowed to pass. As a result, intrusion of foreign matter into the bearing is prevented and sufficient seal-torque reduction is enabled.

Further, due to provision of the adhesion prevention means such as the slit, adhesion is prevented until the seal members are completely abraded. As a result, a torque increase is avoided.

DETAILED DESCRIPTION OF THE INVENTION

Figure 1:
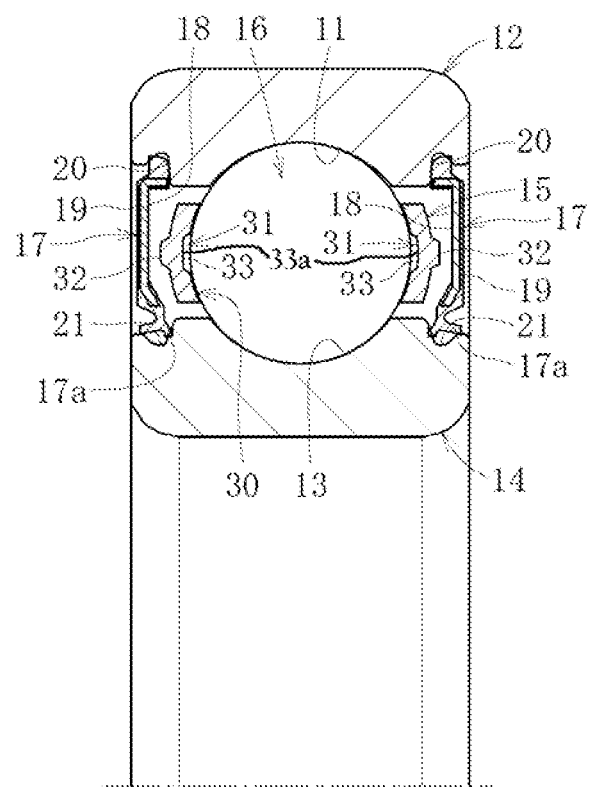
[FIG. 1] A sectional view of a bearing with a retainer according to Embodiment 1 of the present invention.

FIG. 1 illustrates a bearing (deep-groove ball bearing) with a retainer (ball bearing retainer) of Embodiment 1. The ball bearing includes an outer race 12 having a circular-arc outer raceway surface (rolling surface) 11 formed on an inner periphery thereof, an inner race 14 having a circular-arc inner raceway surface (rolling surface) 13 formed on an outer periphery thereof to face the outer raceway surface 11, a plurality of balls 16 accommodated between the outer raceway surface 11 and the inner raceway surface 13, a retainer 15 according to the present invention for rollably supporting the balls 16, and seal members 17 and 17 mounted to axial end portions of the outer race 12.

Thus, the bearing can be referred to as a sealed bearing, which is used for automobile transmissions and the like. The inner race 14 and the outer race 12 constitute bearing races. Further, grease is initially sealed in the bearing. The roller bearing is of an inner-race rotating type that the inner race 14 constitutes a rotating race and the outer race 12 constitutes a fixed race.

Figure 2:
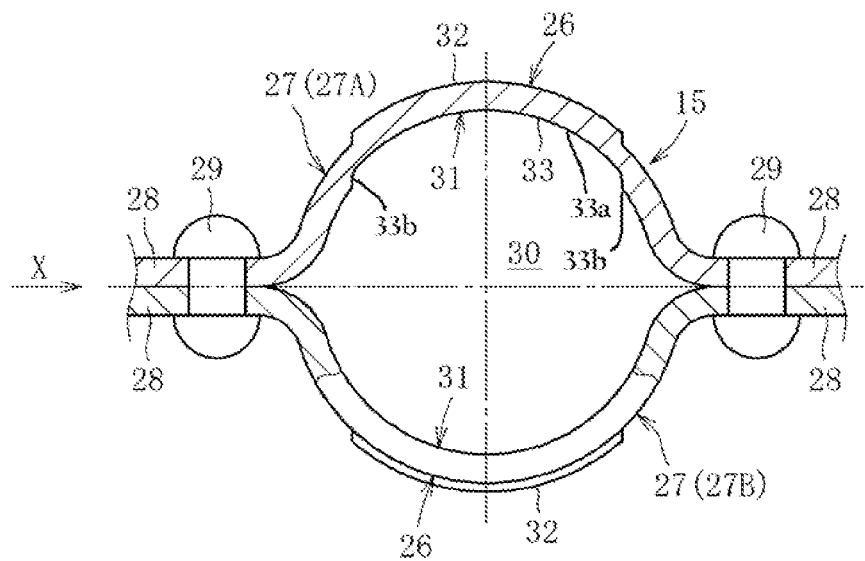
[FIG. 2] A main-portion enlarged sectional view of the retainer of FIG. 1.
Figure 3:
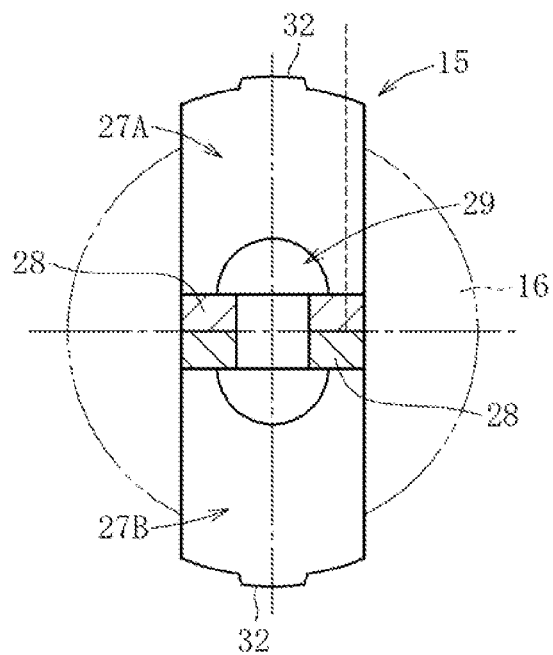
[FIG. 3] A view seen in a direction indicated by the arrow X of FIG. 2.

The outer race 12, the inner race 14, and the balls 16 are made, for example, of high-carbon chrome bearing steel such as SUJ2, and the retainer 15 is a press-worked product of a steel strap of cold-rolled steel (for example, one of SPCC type according to JIS standards). As illustrated in FIGS. 2 and 3, the retainer 15 is formed by combination of two annular retaining plates 27A and 27B each having semispherical swelling portions 26 arranged at predetermined intervals along a circumferential direction. Specifically, each of the annular retaining plates 27A and 27B includes the semispherical swelling portions 26 arranged along the circumferential direction and flat portions 28 between the semispherical swelling portions 26 adjacent to each other. In a combined state, the flat portions 28 and 28 are superimposed on each other, and the flat portions 28 and 28 are coupled to each other through intermediation of fasteners 29 such as rivets. Thus, the semispherical swelling portions 26 face each other, to form a ring-shaped ball-fitting portion (pocket) 30.

In the retainer 15, ball non-contact portions 31 are provided on ball-facing surfaces of the pocket 30. In this case, a contact area in the pocket 30 with respect to the ball 16 is reduced by from 15% to 30% in comparison with a contact area with respect to the ball 16 without provision of the ball non-contact portions 31.

Specifically, in accordance with formation of a rectangular protruding portion 32 on an opposite ball-facing surface, a rectangular recessed portion 33 is provided on a ball-facing surface, the protruding portion 32 projecting to an opposite ball side, the recessed portion 33 being recessed to the opposite ball side. Each of the ball non-contact portions 31 is constituted by the recessed portion 33. Each of the recessed portions 33 includes a bottom surface 33a and side surfaces 33b rising from a peripheral border of the bottom surface 33a. As illustrated in FIGS. 1 and 2, a width of the recessed portions 33 can be larger than a depth of the bottom surfaces 33a of the recessed portions 33, and the depth of the bottom surfaces 33a can be constant along a circumferential direction of the semispherical swelling portions 26 and constant along the radial direction of the retainer. As illustrated in FIGS. 4A-4F, various ones may be employed as the protruding portion 32.

Figure 4A:
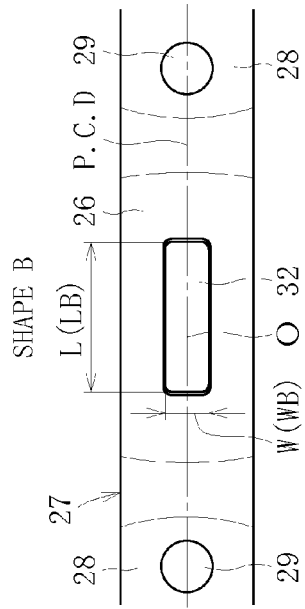
[FIG. 4A] A main-portion schematic view of the retainer illustrated in FIG. 1, illustrating a protruding portion of the retainer.

Specifically, a circumferential length L of a shape A illustrated in FIG. 4A is defined as LA, and a width dimension W thereof is defined as WA. Further, the circumferential length L of a shape B illustrated in FIG. 4B is defined as LB shorter than LA, and the width dimension W thereof is defined as WB equal to WA.

Figure 4B:
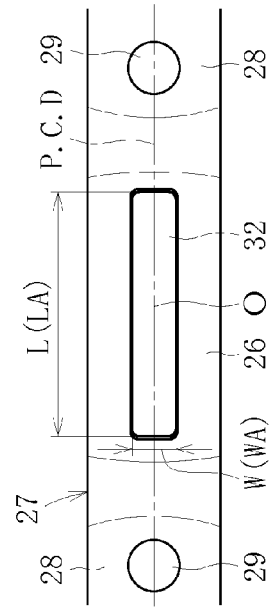
[FIG. 4B] A main-portion schematic view of a retainer according to Modification 1, illustrating the protruding portion of the retainer.
Figure 4C:
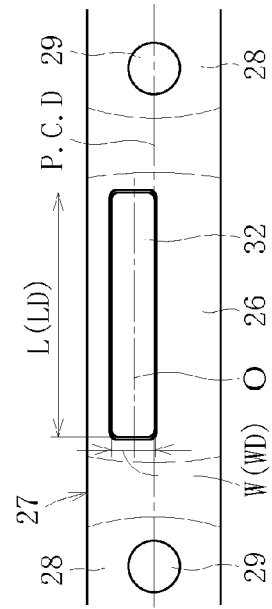
[FIG. 4C] A main-portion schematic view of a retainer according to Modification 2, illustrating the protruding portion of the retainer.
Figure 4D:
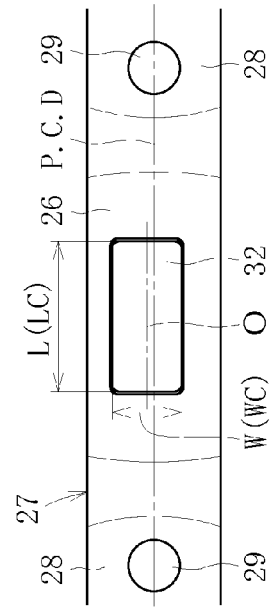
[FIG. 4D] A main-portion schematic view of a retainer according to Modification 3, illustrating the protruding portion of the retainer.

The circumferential length L of a shape C illustrated in FIG. 4C is defined as LC equal to LB, and the width dimension W thereof is defined as WC larger than WA. The circumferential length L of a shape D illustrated in FIG. 4D is defined as LD equal to LA, and the width dimension W thereof is defined as WD equal to WA.

Figure 4E:
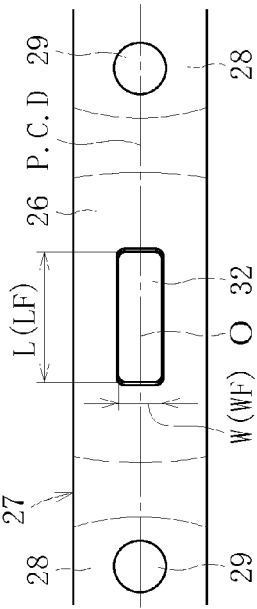
[FIG. 4E] A main-portion schematic view of a retainer according to Modification 4, illustrating the protruding portion of the retainer.

The circumferential length L of a shape E illustrated in FIG. 4E is defined as LE equal to LB, and the width dimension W thereof is defined as WE equal to WA. The circumferential length L of a shape F illustrated in FIG. 4F is defined as LF equal to LB, and the width dimension W thereof is defined as WF equal to WA.

Figure 4F:
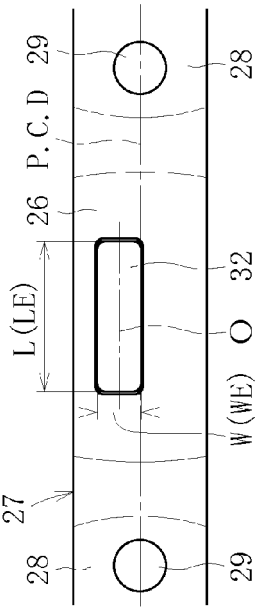
[FIG. 4F] A main-portion schematic view of a retainer according to Modification 5, illustrating the protruding portion of the retainer.

The shape A illustrated in FIG. 4A, the shape B illustrated in FIG. 4B, and the shape F illustrated in FIG. 4F are the same as each other in that a center line O of the protruding portions 32 correspond to a pitch circle PCD of the balls 16 and that the protruding portions 32 are arranged on the pitch circle PCD. The shape C illustrated in FIG. 4C, the shape D illustrated in FIG. 4D, and the shape E illustrated in FIG. 4E are the same as each other in that the center line O of the protruding portion 32s are shifted from the pitch circle PCD of the balls 16 to a radially outer side of the bearing. In this case, although the shift is small in the shape C illustrated in FIG. 4C, the shift is large in the shape D illustrated in FIG. 9D and in the shape E illustrated in FIG. 4E, in which one long side corresponds to the pitch circle PCD of the balls 16.

That is, even when the protruding portions 32 vary from each other as illustrated in FIGS. 4A, 4B, 9C, 4D, 4E, and 4F, it is only necessary that the ball non-contact portion 31 of the recessed portion 33 formed in accordance therewith reduce the contact area in the pocket 30 with respect to the ball 16 by from 15% to 30% in comparison with the case where the ball non-contact portions 31 are not provided.

By the way, the protruding portion 32 may have a rectangular shape (rectangular shape) in which a rotational dimension is larger than a radial dimension, a rectangular shape (rectangular shape) in which, in contrast, the radial dimension is larger than the rotational dimension, or may have a square shape in which the rotational dimension and the radial dimension are equal to each other. Alternatively, instead of the rectangular shape, an oblong shape or an elliptical shape may be employed. Even when the elliptical shape is employed, the elliptical shape may be larger in the rotational dimension than in the radial dimension, or in contrast, may be larger in the radial dimension than in the rotational dimension. Further alternatively, a circular shape may be employed.

Figure 5A:
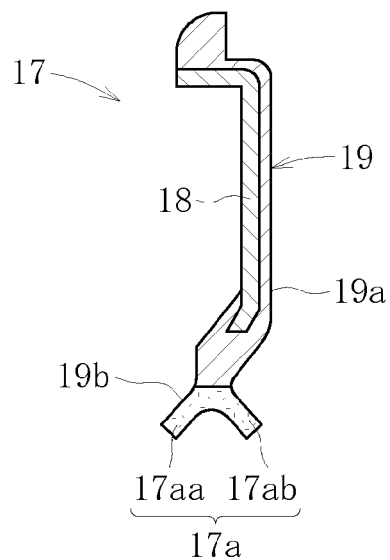
[FIG. 5A] An enlarged sectional view of a seal member.

As illustrated in FIG. 5A, the seal member 17 includes a core 18, a coating portion (elastic member) 19 constituted by a synthetic resin, a rubber material, or the like for coating the core 18. Outer peripheral portion of the seal member 17 is fixed in a fitting state to a seal attachment groove 20 formed in an inner peripheral surface of the outer race 12 as the fixed race. The inner race 14 as the rotating race is provided with a seal groove 21 constituted by a circumferential groove formed at a position corresponding to an inner peripheral portion of the seal member 17. A distal end of a seal lip portion 17a formed at an inner peripheral side end of the seal member 17 comes in sliding contact with an inner surface of the seal groove 21 of the inner race 14. The seal lip portion 17a includes two bisected axial lip portions 17aa and 17ab. A first axial lip portion 17aa extends to an inner side of the bearing so as to come into axial contact with an inner wall surface of the seal groove 21 of the inner race 14. A second axial lip portion 17ab extends to an outer side of the bearing so as to come into contact with an outer wall surface of the seal groove 21 of the inner race 14.

The seal lip portion 17a is formed as a part of the elastic member 19. In this context, a part including at least the distal end portion including the two axial lip portions 17aa and 17ab constitutes a high-abrasion-material portion 19b made of a material prone to abrasion. Specifically, the elastic member 19 of the seal member 17 is constituted by a body portion 19a for coating the core 18 and the high-abrasion-material portion 19b provided continuously with the body portion 19a. In this case, the high-abrasion-material portion 19b is made of a high-abrasion rubber material and the body portion 19a is constituted by a normal rubber material. The seal members 17 as a whole are formed by vulcanization of a rubber material, and the core 18 is bonded to the elastic member 19 at the time of the vulcanization. The type of the high-abrasion rubber material constituting the high-abrasion-material portion 19b is selected on the basis of use temperature and compatibility with a lubricating oil.

In the present invention, by provision of the ball non-contact portion 31 on each of the ball-facing surfaces, resistance generated when lubricant passes inside the pocket can be reduced. Further, by the provision of the ball non-contact portion 31, an amount of an oil film formed between the ball 16 and the pocket 30 can be reduced. In this case, when the ball non-contact portion is excessively small, a reduction amount of an oil film to be sheared is reduced, and hence torque reduction cannot be achieved. In contrast, when the ball non-contact portion 31 is excessively large, the amount of the oil film formed between the ball 16 and the pocket 30 is excessively small, and hence the ball 16 is unable to smoothly roll. Thus, by setting of a range of the ball non-contact portion 31 as in the present invention, resistance generated when lubricant passes inside the pocket and the amount of the oil film to be sheared can be simultaneously reduced. In this manner, torque reduction can be achieved, which enables environmentally friendly driving due to higher energy efficiency achieved with use of a bearing with the ball bearing retainer for automobiles.

The ball non-contact portion 31 can be reliably formed by provision of the recessed portion 33 in the ball-facing surface, the recessed portion 33 being recessed to the opposite ball side. When the ball non-contact portion 31 is arranged on a radially outer side with respect to the pitch circle of the balls 16, shearing resistance at a high-circumferential velocity position can be reduced, and hence torque reduction can be more stably achieved.

Figure 6:
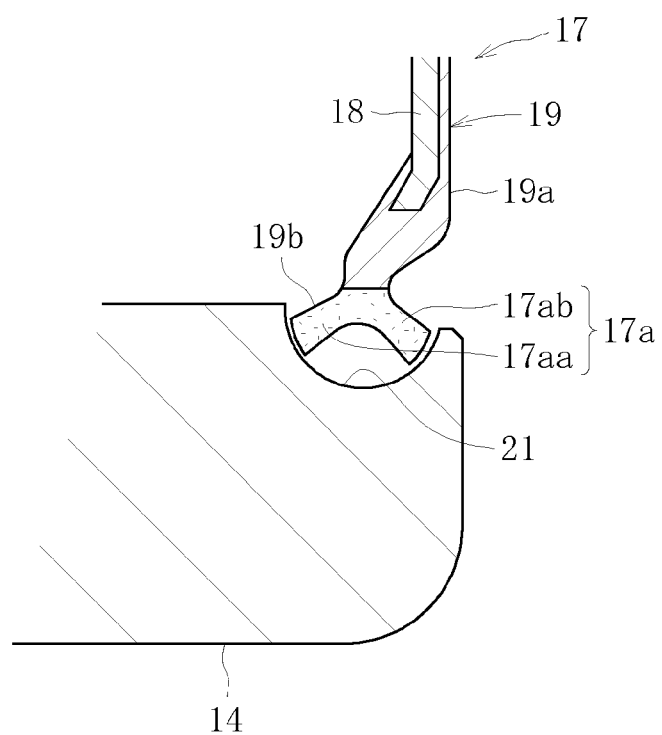
[FIG. 6] A main-portion enlarged sectional view of the seal member illustrated in FIG. 5A.

According to the sealed bearing in this embodiment, at least the distal end portion of the seal lip portion 17a of the Seal member 17 constitutes the high-abrasion-material portion 19b made of the material prone to abrasion (high-abrasion rubber material), the distal end portion coming into sliding contact with the seal groove 21 of the inner race 14 as the rotating race. Thus, as illustrated in the enlarged sectional view of FIG. 6, the seal member 17 which has been of a contact type at an early stage of driving changes, soon after the start of the driving, into the seal member 17 of a non-contact type several hours after the start of driving) due to abrasion of the high-abrasion-material portion 19b. As a result, seal torque can be sufficiently reduced. For example, after the start of driving, the seal member 17 enters a non-contact state within 60 minutes in an oil bath or under an absolute dry condition. As an example of driving conditions, when being used, for example, in a bearing indentified by the bearing number 6207 (JIS standard) operated under the following conditions: a rotational speed of 4,000 rpm; a bearing temperature of 30° C.; rotational torque of approximately 0.075 N·m; and immersion in an mineral-oil bath, the seal member 17 enters a non-contact state within 60 minutes.

With this, the seal torque can be sufficiently reduced. As a result, temperature rise in the bearing can be suppressed, and hence a lubricating oil much less viscous than lubricating oils conventionally used can be selected. Further, when being used for automobile transmissions, the seal member 17 is capable of contributing to higher energy efficiency of automobiles.

Further, the abrasion of the high-abrasion-material portion 19b causes formation of a minute gap constituting an optimum labyrinth between the seal lip portion 17a of the seal member 17 and the seal groove 21 of the inner race 14. Thus, intrusion of foreign matter having a large grain size which may have an influence on a fatigue life is prevented while a lubricating oil is allowed to pass through the labyrinth. The high-abrasion-material portion 19b may not necessarily be abraded to an extent that contact is terminated; alternatively, may be abraded so as to make contact which is slight to an extent that contact pressure can be practically ignored.

Figure 5B:
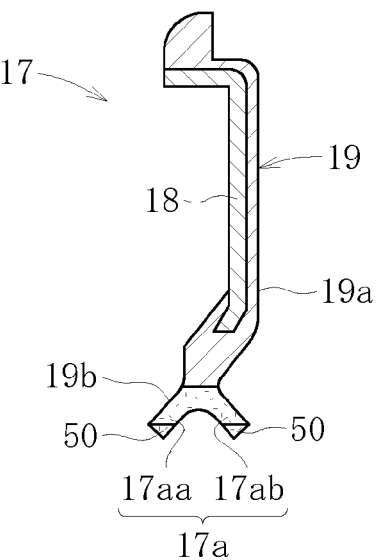
[FIG. 5B] An enlarged sectional view of another seal member.

Note that, in this embodiment, although a case is exemplified where the high-abrasion rubber material is used as a material which is prone to abrasion and constitutes the high-abrasion-material portion 19b of the seal member 17, for example, a resin material may be used as another material prone to abrasion. Other examples of the materials constituting the high-abrasion-material portion 19b include a solid lubricant material, non-woven fabric, and mild steel. Further, in this embodiment, as illustrated in FIG. 5B, the seal member 17 may be provided with adhesion prevention means such as a vent slit 50.

The adhesion prevention means is means for preventing the seal member 17 from being caused to adhere to the inner race 14 owing to reduction of inner pressure of the bearing. In this case, at a distal end of each of the axial lip portions 17aa and 17ab of the seal lip portion 17a of the seal member 17, the slit 50 is provided which produces a vent state in inner and outer directions of a bearing space under a state in which the axial lip portions 17aa and 17ab are held in contact with the inner surface of the seal groove 21. The slits 50 are provided at several points in the circumferential direction, for example, at two points.

As described above, by provision of the adhesion prevention means such as the slit 50, the seal member 17 is prevented from adhering to the inner surface of the seal groove 21 of the inner race 14 owing to the reduction of the inner pressure of the bearing until the high-abrasion-material portion 19b is completely abraded. As a result, a torque increase is avoided from being caused by adhesion.

Figure 7:
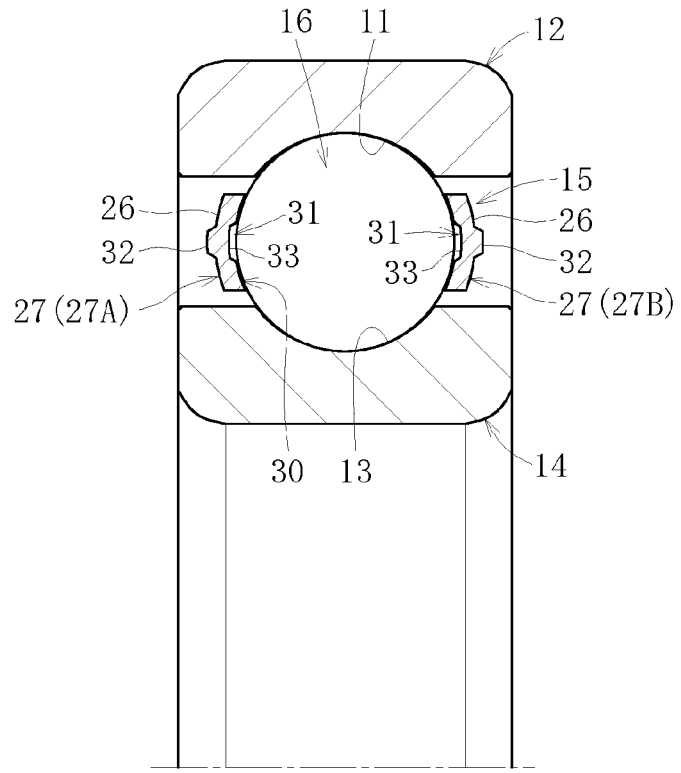
[FIG. 7] A sectional view of another bearing with the retainer illustrated in FIG. 2.

A ball bearing (deep-groove ball bearing) illustrated in FIG. 7 is of a type free from the seal members 17. That is, the ball bearing illustrated in FIG. 7 is the same as the ball bearing (deep-groove ball bearing) illustrated in FIG. 1 except that the following are omitted: the seal members 17, the seal attachment grooves 20 to which the seal members 17 are attached, and the seal grooves 21 with which the lip portions 17a of the seal members 17 come into contact.

Thus, the ball bearing (deep-groove ball bearing) illustrated in FIG. 7 provides functions and advantages other than functions and advantages provided by the seal members 17 and the ball bearing (deep-groove ball bearing) illustrated in FIG. 1.

Figure 8:
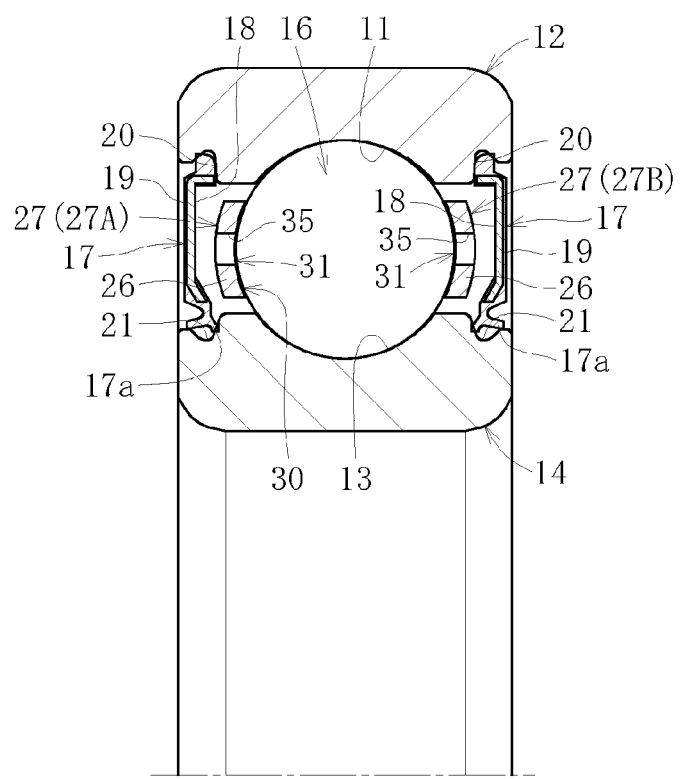
[FIG. 8] A sectional view of a bearing with a retainer according to Embodiment 2 of the present invention.
Figure 9:
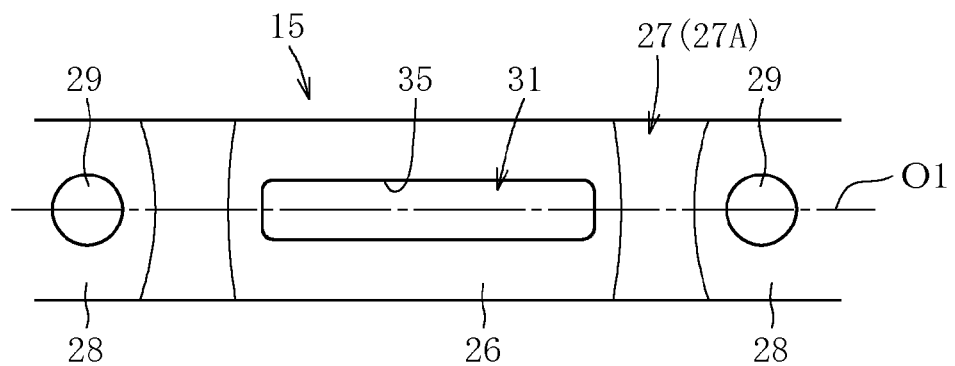
[FIG. 9] A main-portion schematic view of the retainer of FIG. 8.

FIG. 8 illustrates a bearing: (deep-groove ball bearing) with a ball bearing retainer according to Embodiment 2. The retainer 15 in this case is provided with a slit 35 formed in each of the semispherical swelling portions 26, the slit 35 constituting the ball non-contact portion 31. As illustrated in FIG. 9, the slit 35 in this case has a rectangular shape, and a center line O1 thereof is arranged on a pitch circle PCD corresponding to the pitch circle PCD of the balls 16.

By the way, the slit 35 may have a rectangular shape (rectangular shape) in which a rotational dimension is larger than a radial dimension, a rectangular shape (rectangular shape) in which, in contrast, the radial dimension is larger than the rotational dimension, or may have a square shape in which the rotational dimension and the radial dimension are equal to each other. Alternatively, instead of the rectangular shape, an oblong shape or an elliptical shape may be employed. Even when the elliptical shape is employed, the elliptical shape may be larger in the rotational dimension than in the radial dimension, or in contrast, may be larger in the radial dimension than in the rotational dimension. Further alternatively, a circular shape may be employed.

Regarding the arrangement position of the slit 35, as illustrated in FIG. 9, the slit 35 may be arranged on the pitch circle PCD of the balls 16, or may be arranged on the radially outer side with respect to the pitch circle PCD. A shift amount in this case can be arbitrarily set as well. That is, it is only necessary that the ball non-contact portion 31 formed of the slit 35 reduce the contact area in the pocket 30 with respect to the ball 16 by from 15% to 30% in comparison with the contact area with respect to the ball 16 without provision of the ball non-contact portion 31. Note that, other structural details of the bearing illustrated in FIG. 9 are the same as those of the bearing illustrated in FIG. 1, and hence description thereof is omitted.

As illustrated in FIG. 8, even when the ball non-contact portions 31 are formed of the slits 35, resistance generated when lubricant passes inside the pocket can be reduced. Further, the amount of the oil film formed between the ball 16 and the pocket 30 can be reduced. In this way, the retainer illustrated in FIG. 8 provides the functions and advantages same as those of the retainer illustrated in FIG. 1. Further, when the slits 35 are provided, a dimension of the retainer 15 in an axial direction of the bearing does not increase unlike the case where the protruding portions 32 are provided, and hence compactification can be achieved. That is, torque can be reduced, with the dimension same as that of the conventional retainers free from the ball non-contact portions 31 being maintained.

Figure 10:
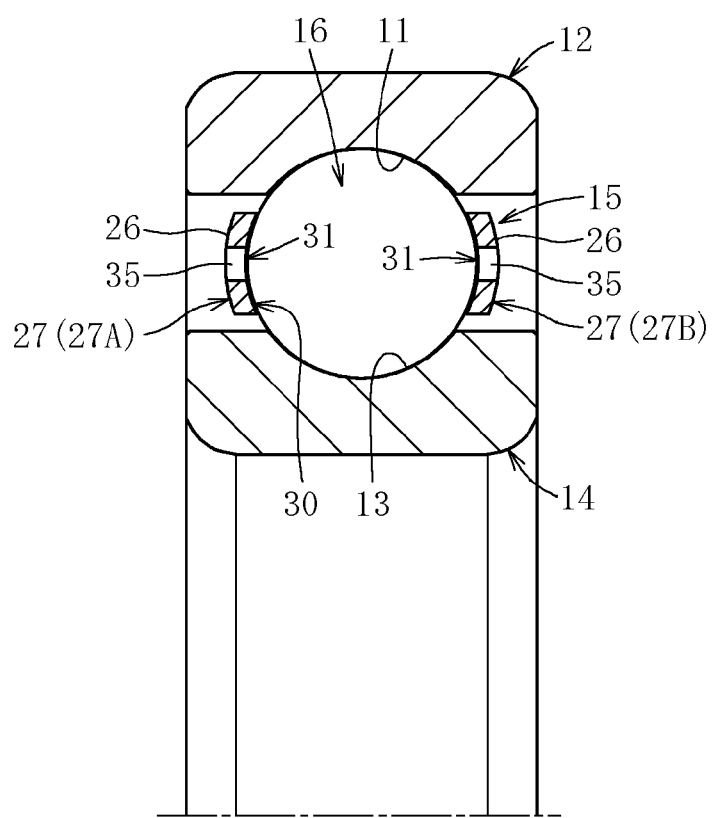
[FIG. 10] A sectional view of another bearing with the retainer of FIG. 8.

A ball bearing (deep-groove ball bearing) illustrated in FIG. 10 is of a type free from the seal members 17. That is, the ball bearing illustrated in FIG. 10 is the same as the ball bearing (deep-groove ball bearing) illustrated in FIG. 8 except that the following are omitted: the seal members 17, the seal attachment grooves 20 to which the seal members 17 are attached, and the seal grooves 21 with which the lip portions 17a of the seal members 17 come into contact. Thus, the ball bearing (deep-groove ball bearing) illustrated in FIG. 10 provides functions and advantages other than the functions and advantages provided by the seal members 17 and the ball bearing (deep-groove ball bearing) illustrated in FIG. 8.

By the way, although being a metal retainer formed by press working in the above-mentioned embodiments, the retainer 15 may be molded by forging; alternatively, formed by a grinding process, or electrical discharge machining (including wire cutting). The electrical discharge machining is a machine work method for removing a part of a surface of a workpiece by arc electric discharge repeated in a short cycle between an electrode and a workpiece. The wire cut is one type of the electrical discharge machining, specifically, a method for processing a metal material with use of electric discharge of a tensioned wire.

Further, the retainer 15 is not limited to a metal retainer, and may be a synthetic resin product. Examples of resin materials used for resin retainers include a polyphenylene sulfide resin (hereinafter, referred to as PPS resin) and polyamide 46 (PA46) which have been conventionally used for retainers of this type. In particular, examples of materials used for the resin retainers of, for example, bearings for automobile alternators which require long-term thermal resistance in a temperature range beyond allowable temperature ranges of the conventionally used resin materials (for example, approximately 200° C. or more) include a polyimide resin (hereinafter, referred to as PI resin), a polyamide-imide resin (hereinafter, referred to as PAI resin), and a polyether-ether-ketone resin (hereinafter, referred to as PEEK resin).

The resin retainer can be formed, for example, by injection molding; alternatively, molded by a grinding process. The resin retainer also can be provided with the ball non-contact portions 31, with the result that the contact area in the pocket 30 with respect to the ball 16 is reduced by from 15% to 30% in comparison with the contact area with respect to the ball 16 without provision of the ball non-contact portions 31.

When the ball non-contact portions 31 are provided in the resin retainer, as illustrated in FIG. 1, by formation of the rectangular protruding portions 32 on the opposite ball-facing surfaces, the rectangular recessed portions 33 may be provided on the ball-facing surface so that the ball non-contact portions 31 are constituted by the recessed portions 33, the protruding portions 32 projecting to the opposite ball side, the recessed portions 33 being recessed to the opposite tall side. Further, the slits 35 may be provided so that the ball non-contact portions 31 are constituted by the slits 35. Thus, the resin retainer provides the functions and advantages same as those of the metal retainer illustrated in FIG. 1.

Figure 11A:
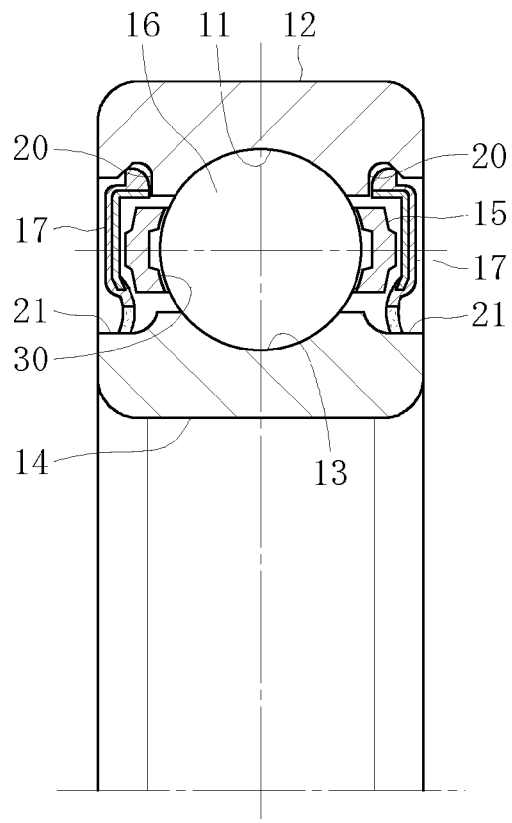
[FIG. 11A] A sectional view of a sealed bearing according to another embodiment.
Figure 11B:
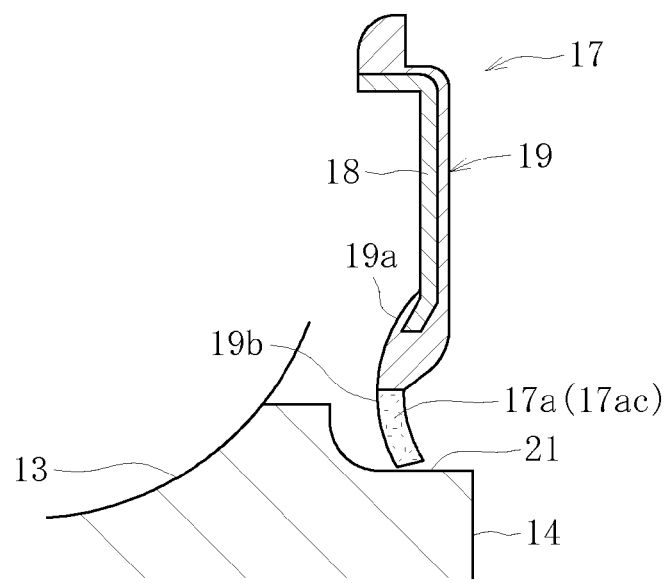
[FIG. 11B] An enlarged sectional view of a seal member of the sealed bearing of FIG. 11A.

FIGS. 11A and 11B illustrate a modification of the seal members 17. The seal lip portion 17a of each of the seal members 17 in this case includes one radial lip portion 17ac extending to a radially inner side so as to come into radial contact with the seal groove 21 of the inner race 14. The following structural details of each of the seal members 17 are the same as the seal member 17 illustrated in FIG. 5A: at least a distal end portion including the radial lip portion 17ac of the seal lip portion 17a constitutes the high-abrasion-material portion 19b made of the material prone to abrasion; the high-abrasion-material portion 19b is made of the high-abrasion rubber material; and the like.

The seal members 17 illustrated in FIGS. 11A and 11B also prevents intrusion of foreign matter into the bearing and enables sufficient seal-torque reduction. Thus, when being used for automobile transmissions, the seal members 17 are capable of contributing to higher energy efficiency of automobiles.

Figure 12A:
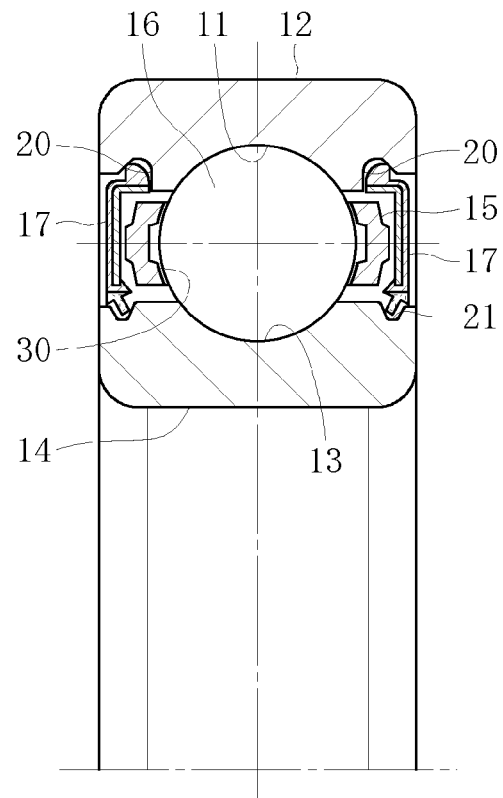
[FIG. 12A] A sectional view of a sealed bearing according to another embodiment.
Figure 12B:
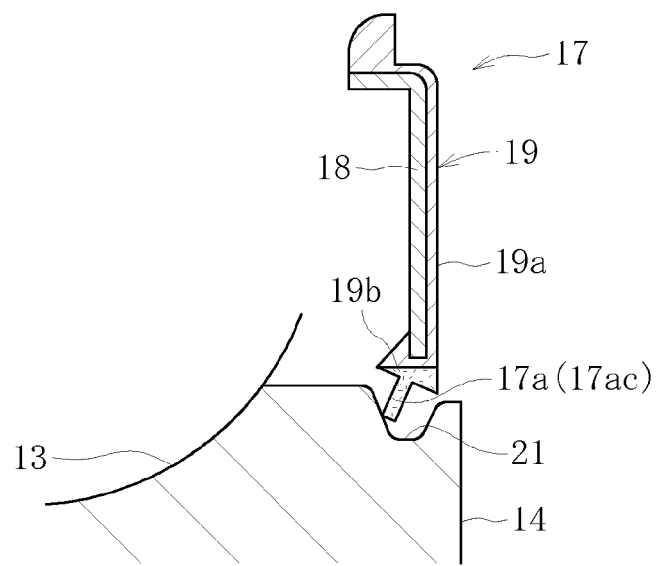
[FIG. 12B] An enlarged sectional view of a seal member of the sealed bearing of FIG. 12A.

FIGS. 12A and 12B illustrate another modification of the seal members 17. The seal lip portion 17a of each of the seal members 17 includes only one radial lip portion 17ac extending to the inner side of the bearing so as to come into axial contact with the inner wall surface of the seal groove 21 of the inner race 14. The following structural details of each of the seal members 17 are the same as the seal member 17 illustrated in FIG. 5A: at least the part 19b including a distal end portion including the radial lip portion 17ac of the seal lip portion 17a constitutes the high-abrasion-material portion made of the material prone to abrasion; the high-abrasion-material portion 19b is made of the high-abrasion rubber material; and the like.

The seal members 17 illustrated in FIGS. 12A and 12B also prevents intrusion of foreign matter into the bearing and enables sufficient seal-torque reduction. Thus, when being used for automobile transmissions, the seal members 17 are capable of contributing to higher energy efficiency of automobiles.

Hereinabove, although description is made of the embodiments of the present invention, the present invention is not limited to the above-mentioned embodiments, and various modifications may be made thereto. For example, although being arranged along the rotational direction in the above-mentioned embodiments, the ball non-contact portions 31 may be inclined with respect to the rotational direction. Further, the number of the ball non-contact portions 31 to be formed is not limited to one with respect to each of the semispherical swelling portions 26, and two or more ball non-contact portions 31 may be provided to each of the semispherical swelling portions 26. In this case, the plurality of ball non-contact portions 31 may be arranged along the circumferential direction, or along the radial direction.

Whether the protruding portion 32 to be provided has a rectangular shape or a square shape, the slit 35 may have a rectangular shape or a square shape, and corner portions thereof each may have a round shape or not. Further, when the protruding portion 32 to be provided has a rectangular shape or a square shape, it is preferred that a projecting amount of the protruding portion 32 (depth of the recessed portion 33 (i.e., depth of the bottom surface 33a of the recessed portion 33)) be set to be 40% or less of those of the annular retaining plates 27A and 27B. That is, when exceeding 40%, the projecting amount of the protruding portion 32 is excessively large, which leads to difficulty in attachment and an increase in size of the seal members.

EXAMPLES

Example 1

The retainers respectively having shapes A, B, C, D, E, and F illustrated in FIG. 4 (metal retainers: press-worked products) were prepared. Then, ball bearings the same as that illustrated in FIG. 1 were assembled with use of the retainers, and measurement of torque generated therein was carried out. Table 1 below shows the results of the measurement. "Standard product" in Table 1 represents a conventional product without the ball non-contact portions 31.

TABLE 1

|  | Dimension of protruding shape | Contact area between steel ball and retainer (%) | Torque reduction rate (%) |
|---|---|---|---|
| Standard product | — | 100 | — |
| Shape A | 1.6 × 9.0 | 70 | 59 |
| Shape B | 1.6 × 5.5 | 83 | 52 |
| Shape C | 2.6 × 5.5 | 70 | 59 |

TABLE 1-continued

|  | Dimension of protruding shape | Contact area between steel ball and retainer (%) | Torque reduction rate (%) |
| --- | --- | --- | --- |
| Shape D | *1 | 70 | 62 |
| Shape E | *2 | 83 | 54 |
| Shape F | 1.6 × 4.8 | 85 | 50 |

*1 Same as that of Shape A except that position thereof is shifted from on P.C.D to radially outer side by 0.8 mm.
*2 Same as that of Shape B except that position thereof is shifted from on P.C.D to radially outer side by 0.8 mm.

In Table 1, in a row of Shape A, 1.6×9.0 represents that the width W is 1.6 mm and the circumferential length L is 9.0 mm. In a row of Shape B, 1.6×5.5 represents that the dimension W is 1.6 mm and the circumferential length L is 5.5 mm. In a row of Shape C, 2.6×5.5 represents that the dimension W is 2.6 mm and the circumferential length L is 5.5 mm. In a row of Shape D, *1 represents that Shape D is obtained by shift of Shape A from PCD to the radially outer side by 0.8 mm. In a row of Shape E, *2 represents that Shape E is obtained by shift of Shape B from PCD to the radially outer side by 0.8 mm. In Table 1, cells corresponding to Shape A to Shape F on a column of "Contact area between steel ball and retainer" each represent a rate (%) on the premise that an area of "Standard product" is 100%. Further, each of the bearings used in the experiments had the following specifications: an outer diameter dimension of the outer race 12, 72.0 mm; an inner diameter dimension of the outer race 12, 60.2 mm; an outer diameter dimension of the inner race 14, 47.0 mm; an inner diameter dimension of the inner race 14, 35.0 mm; and an outer diameter dimension of each of the balls (steel balls) 16, 11.1 mm.

Those experiments were carried out under the following condition: each of the bearings was rotated at a speed of 4000 r/min under a radial load of 500 N, and partially immersed in a lubricating oil at 30° C. (TOYOTA genuine ATF T-4). In this case, description "partially immersed" represents that, under a state in which an axial line of the bearing was horizontally maintained, only the lowermost one of the balls in a vertical direction was completely immersed.

Figure 13:
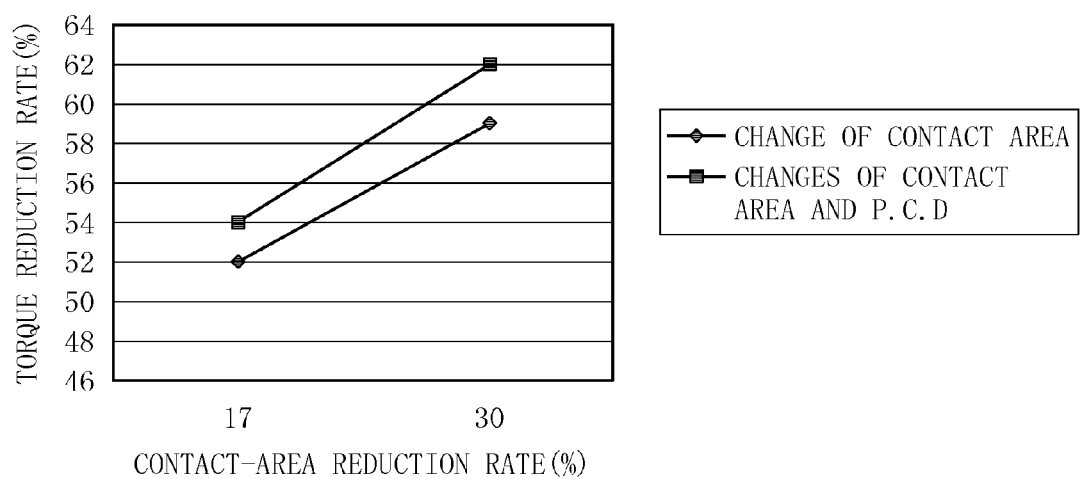
[FIG. 13] A graph diagram showing a relation between a contact-surface reduction rate and a torque reduction rate.

FIG. 13 is a graph showing torque transitions in a case where the contact area was changed and in a case where the shift from PCD to the radially outer side was effected. Table 1 and FIG. 13 confirm that, due to reduction of the contact area by 15%, torque was successfully reduced approximately by 50%. Further, due to reduction of the contact area by 30% and the shift from PCD to the radially outer side by 0.8 mm, torque was successfully reduced approximately by 60%.

Example 2

As illustrated in FIG. 9, the retainer with the slits 35 (metal retainers: press-worked products) was prepared. Then, a ball bearing the same as that illustrated in FIG. 8 was assembled with use of the retainer, and measurement of torque generated therein was carried out. In this case, the contact area was reduced by 30% in comparison with the standard product (retainer without the slits 35). Similarly to Example 1 above, the bearing was rotated at a speed of 4000 r/min under a radial load of 500 N, and partially immersed in a lubricating oil at 30° C. (TOYOTA genuine ATF T-4). In this case, torque reduction approximately by 40% was achieved. Specifically, torque of the standard product was 0.152 Nm, and torque of the retainer with the slits 35 was 0.093 Nm. Further, the bearing used in the measurement had the following specifications: the outer diameter dimension of the outer race 12, 72.0 mm; the inner diameter dimension of the outer race 12, 60.2 mm; the outer diameter dimension of the inner race 14, 47.0 mm; the inner diameter dimension of the inner race 14, 35.0 mm; and the outer diameter dimension of each of the balls (steel balls) 16, 11.1 mm. Note that, the bearing used in Comparison Examples 1 and 2 below had the same size.

Comparison Example 1

A metal retainer was prepared in which each of the semispherical swelling portions 26 was cut on bearing radially-inner and bearing radially-outer sides instead of provision of the protruding portion 32 and the slits 35. Then, a ball bearing the same as that illustrated in FIG. 8 was assembled with use of the retainer, and measurement of torque generated therein was carried out. The contact area was reduced by 25% in comparison with the standard product (retainer without the slits 35). The measurement was carried out under the same condition as those in Examples above. In this case, torque reduction approximately by 11% was achieved. Specifically, torque of the standard product was 0.152 Nm, and torque of the retainer cut on the bearing radially-inner and bearing radially-outer sides was 0.135 Nm.

Comparison Example 2

Further, a resin retainer was prepared in which each of the semispherical swelling portions 26 was cut on the bearing radially-outer side. Then, a ball bearing the same as that illustrated in FIG. 8 was assembled with use of the retainer, and measurement of torque generated Therein was carried out. In this case, a resin material of the retainer was PA66, and the contact area was reduced by 30% in comparison with the standard product. The measurement was carried out under the same condition as those in Examples above. In this case, torque reduction approximately by 18% was achieved. Specifically, torque of the standard product was 0.152 Nm, and torque of the retainer cut on the bearing radially-inner and bearing radially-outer sides was 0.124 Nm.

Example 3

Figure 14A:
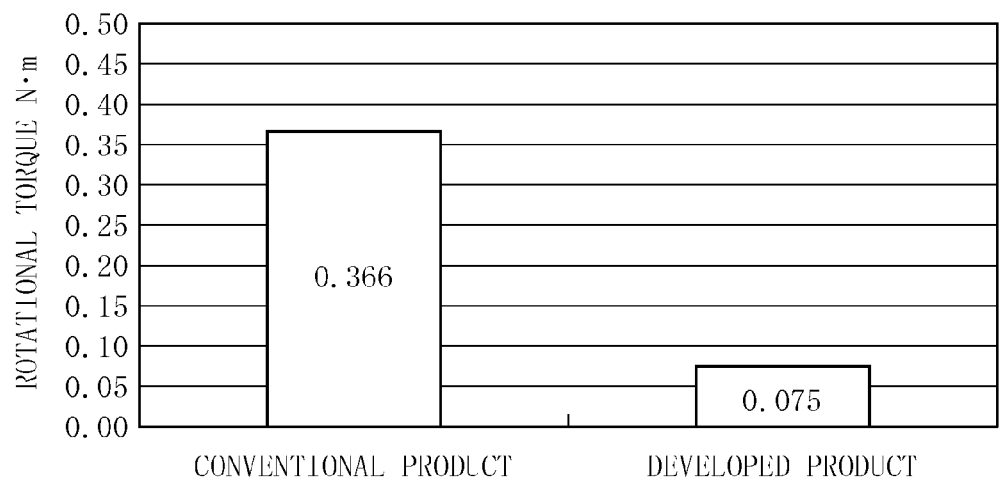
[FIG. 14A] A graph showing comparison of rotational torque between the sealed bearing according to the present invention and a conventional sealed bearing.
Figure 14B:
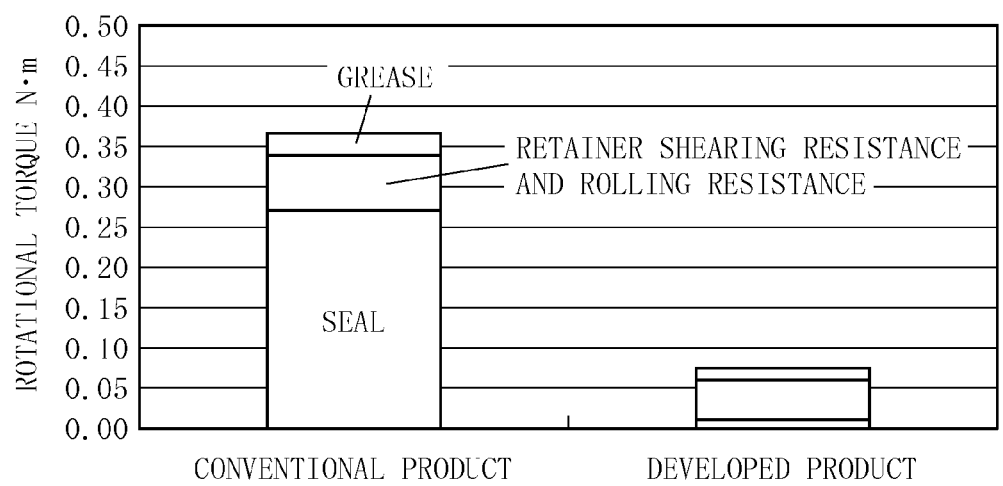
[FIG. 14B] A graph showing details of factors of rotation and torque.
Figure 15:
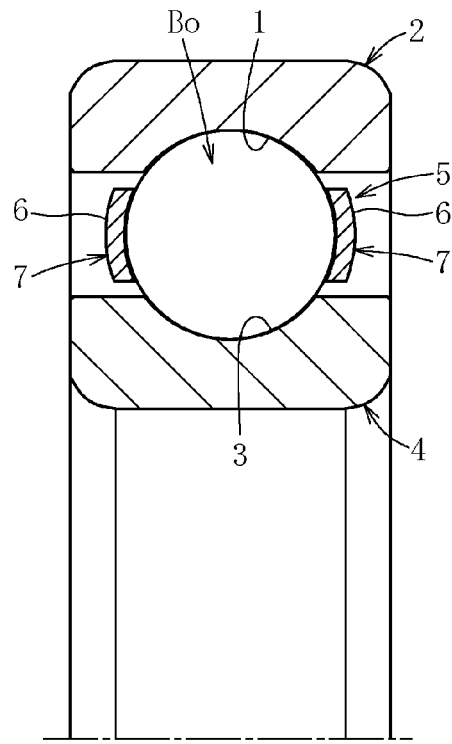
[FIG. 15] A sectional view of a bearing with a conventional retainer.
Figure 16:
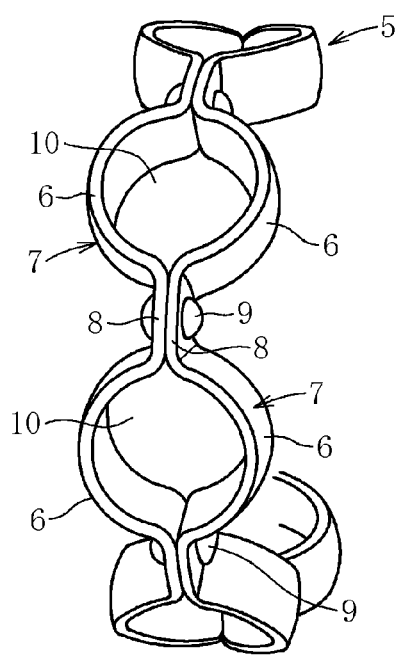
[FIG. 16] A perspective view of the conventional retainer.

FIG. 14 are graphs showing test results obtained by comparison of the rotational torque of the sealed bearings according to Embodiments of the present invention with that of a conventional sealed bearing. As shown in FIG. 14A, in comparison with the rotational torque of the conventional product, the rotational torque is significantly reduced in the sealed bearings according to Embodiments. This is because, as shown in FIG. 14B, the factor of the seal torque is eliminated in the sealed bearings according to Embodiments, whereas specific factors of the rotational torque of the conventional product include grease resistance (retainer shearing resistance and rolling resistance) and seal torque.

Industrial Applicability

The bearing according to the present invention may be employed to a roller bearing of an inner-race rotation type or a roller bearing of an outer-race rotation type.

Reference Signs List

12 outer race
14 inner race
15 retainer
16 ball
17 seal member
17*a* seal lip portion
20 seal attachment groove
21 seal groove 26 semispherical swelling portion
27A, 27B annular retaining plate
27A, 27B annular retaining plate
30 pocket
31 ball non-contact portion
33 recessed portion
35 slit

The invention claimed is:

1. A retainer comprising two annular retaining plates, each of the two annular retaining plates having semispherical swelling portions arranged at predetermined intervals along a circumferential direction, and the semispherical swelling portions of the two annular retaining plates facing each other and forming pockets for retaining balls, wherein:
   each of the pockets has ball-facing surfaces each including a ball non-contact portion;
   the ball non-contact portions are rectangular recessed portions;
   the rectangular recessed portions are provided on the ball-facing surfaces, the rectangular recessed portions forming rectangular protruding portions on sides of the retainer opposite to the ball-facing surfaces;
   the rectangular protruding portions are arranged on a pitch circle of the balls;
   a circumferential length of the rectangular protruding portions is longer than a width dimension of the rectangular protruding portions;
   each of the rectangular recessed portions includes a bottom surface and side surfaces rising from a peripheral border of the bottom surface;
   a width of the rectangular recessed portions of the retainer is larger than a depth of the bottom surfaces of the rectangular recessed portions in an axial direction of the retainer;
   the depth of the bottom surfaces of the rectangular recessed portions is constant along a circumferential direction of the semispherical swelling portions; and
   the ball non-contact portion of each of the pockets reduces a contact area of each of the pockets by 15% to 30%, to reduce resistance generated when lubricant passes inside the pockets and an amount of oil film to be sheared.

2. A retainer according to claim 1, wherein the two annular retaining plates are made of a metal and molded by press working.

3. A retainer according to claim 1, wherein the two annular retaining plates are made of a metal and molded by casting.

4. A retainer according to claim 1, wherein the two annular retaining plates are molded by cutting.

5. A retainer according to claim 1, wherein the two annular retaining plates are made of a resin and formed by injection molding.

6. A retainer according to claim 1, wherein the rectangular protruding portions project to the sides of the retainer opposite to the ball-facing surfaces in a thickness direction of the two annular retaining plates.

7. A retainer according to claim 1, wherein the depth of the bottom surfaces of the rectangular recessed portions is constant along the radial direction of the retainer.

8. A retainer according to claim 7, wherein the depth of the bottom surfaces of the rectangular recessed portions is set to be 40% or less of a thickness of the annular retaining plates.

9. A deep-groove ball bearing, comprising:
   an outer race having an outer raceway surface formed on an inner periphery thereof;
   an inner race having an inner raceway surface formed on an outer periphery thereof;
   a plurality of balls rollable between the inner raceway surface and the outer raceway surface; and
   the retainer according to claim 1 arranged between the inner race and the outer race.

10. A sealed bearing, comprising:
   the retainer according to claim 1;
   a plurality of rolling elements retained through intermediation of the retainer to be interposed between raceway surfaces facing each other of a pair of bearing races; and
   a plurality of seal members for sealing a bearing space formed between the pair of bearing races,
   wherein each of the seal members comprises a contact seal having
      a proximal end fixed to any one of the pair of bearing races, and
      a seal lip portion contacting another of the pair of bearing races, and
   wherein at least a distal end of the seal lip portion of each of the seal members comprises an abrasion material which is to be abraded during rotation of the sealed bearing.

11. A sealed bearing according to claim 10, wherein the at least the distal end of the seal lip portion of each of the seal members is an abrasion-material portion that is more prone to abrasion than other parts of each of the seal members.

12. A sealed bearing according to claim 10, wherein the abrasion material comprises a rubber material.

13. A sealed bearing according to claim 10, wherein the abrasion material comprises a resin material.

14. A sealed bearing according to claim 10, wherein the seal lip portion of each of the seal members is formed in a shape to contact in an axial direction an inner surface of a corresponding one of a plurality of seal grooves formed in the other of the pair of bearing races facing each other.

15. A sealed bearing according to claim 10, wherein the seal lip portion of each of the seal members is formed in a shape to contact in a radial direction the other of the pair of bearing races facing each other.

16. A sealed bearing according to claim 10, wherein each of the seal members comprises adhesion prevention means for preventing the respective seal member from adhering to the other of the pair of bearing races.

* * * * *